(12) United States Patent
Tanoni

(10) Patent No.: US 10,263,980 B2
(45) Date of Patent: Apr. 16, 2019

(54) NETWORK NODE, DEVICE AND METHODS FOR PROVIDING AN AUTHENTICATION MODULE

(71) Applicant: Gustavo Tanoni, St-Lambert (CA)

(72) Inventor: Gustavo Tanoni, St-Lambert (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 302 days.

(21) Appl. No.: 15/121,490

(22) PCT Filed: Mar. 6, 2014

(86) PCT No.: PCT/IB2014/059502
§ 371 (c)(1),
(2) Date: Aug. 25, 2016

(87) PCT Pub. No.: WO2015/132632
PCT Pub. Date: Sep. 11, 2015

(65) Prior Publication Data
US 2016/0366127 A1 Dec. 15, 2016

(51) Int. Cl.
*H04L 21/00* (2006.01)
*H04L 29/06* (2006.01)
(Continued)

(52) U.S. Cl.
CPC ......... *H04L 63/0853* (2013.01); *H04W 12/04* (2013.01); *H04W 12/06* (2013.01)

(58) Field of Classification Search
CPC .................. H04L 63/0853; H04W 12/06
See application file for complete search history.

(56) References Cited

U.S. PATENT DOCUMENTS 8,122,240 B2    2/2012  Blom et al.
8,458,479 B2 *  6/2013  Takashima ............ H04L 9/3247
                                                              380/28
(Continued)

FOREIGN PATENT DOCUMENTS

WO    2009092115 A2    7/2009
WO    2012058429 A2    5/2012

OTHER PUBLICATIONS

ETSI TS 135 206, V11.0.0, Universal Mobile Telecommunications System (UMTS); LTE; 3G Security; Specification of the MILENAGE algorithm set: An example algorithm set for the 3GPP authentication and key generation functions f1, f1*, f2, f3, f4, f5 and f5*; Document 2: Algorithm specification, Nov. 2012, pp. 1-33.
(Continued)

*Primary Examiner* — Morshed Mehedi
(74) *Attorney, Agent, or Firm* — Julie Dufort; Ericsson Canada Inc.

(57) ABSTRACT

The invention relates to a method, for providing an Authentication Module (AM) to a device. The method comprises computing an authentication parameter to be stored in the AM, using an identifier (ID) associated with the device, authentication data associated with the device and an encryption parameter associated with the device. The method also comprises providing the AM to the device. The invention also relates to a method, for updating an AM and to a method to authenticate a device using an AM. The invention further relates to a device and network node executing the methods.

2 Claims, 8 Drawing Sheets

(51) Int. Cl.
*H04W 12/06* (2009.01)
*H04W 12/04* (2009.01)

(56) References Cited

U.S. PATENT DOCUMENTS

| | | | |
|---|---|---|---|
| 8,863,256 B1* | 10/2014 | Addepalli | H04W 4/046 |
| | | | 726/7 |
| 9,264,425 B1* | 2/2016 | Chen | H04L 63/083 |
| 2011/0238972 A1 | 9/2011 | Semple et al. | |
| 2012/0108205 A1 | 5/2012 | Schell et al. | |
| 2012/0260090 A1* | 10/2012 | Hauck | H04L 63/0853 |
| | | | 713/168 |
| 2013/0227646 A1* | 8/2013 | Haggerty | H04L 63/0853 |
| | | | 726/3 |
| 2013/0227658 A1* | 8/2013 | Leicher | H04L 63/0876 |
| | | | 726/5 |
| 2013/0263239 A1* | 10/2013 | Lim | H04W 12/06 |
| | | | 726/7 |
| 2013/0303122 A1 | 11/2013 | Li et al. | |
| 2013/0343538 A1* | 12/2013 | Mizikovsky | H04W 12/06 |
| | | | 380/255 |

OTHER PUBLICATIONS

Gemalto, Technical White Paper, Smart Card in IMS, Feeling at home. Everywhere. Feb. 2007, pp. 1-11.
ETSI TS 102 223 V11.1.0, Smart Cards; Card Application Toolkit (CAT), (Release 11), , Dec. 2012, pp. 1-227.
3GPP TS 31.103, V5.13.1, 3rd Generation Partnership Project; Technical Specification Group Core Network and Terminals; Characteristics of the IP Multimedia Services Identity Module (ISIM) application (Release 5), Jun. 2007, pp. 1-26.
ETSI TS 131 111, V8.3.0, Digital cellular telecommunications system (Phase 2+); Universal Mobile Telecommunications System (UMTS); Universal Subscriber Identity Module (USIM) Application Toolkit (USAT), Oct. 2008, pp. 1-102.
ETSI TS 102 241, V9.1.0, Smart Cards, UICC Application Programming Interface (UICC API) for Java Card (Release 9), May 2011, pp. 1-35.

* cited by examiner

```
ElectronicSubscriberAuthenticationInfo {}

DEFINITIONS
IMPLICIT TAGS
::=
BEGIN

ElectronicSIM ::= CHOICE {
    version            [0] INTEGER (0..255),
    id                 [1] octet STRING (SIZE (1.. maxImpiLength)),
    idtype             [2] IdType,
    authenticationInfo [3] AuthenticationInfo,
    authSequence       [4] AuthenticationSequence,
    op                 [5] octet STRING (SIZE (16)),
    userData           [6] octet STRING (SIZE (1.. maxUserDataLength)),
    vendorData         [7] octet STRING (SIZE (1.. maxVendorDataLength)),
    serviceProviderData [8] octet STRING (SIZE (1.. maxServiceDataLength)),
    deviceData         [9] octet STRING (SIZE (1.. maxDeviceDataLength))
}

IdType ::= ENUMERATE {
    Impi (1),
    Imsi (2)
}

AuthenticationInfo ::= SEQUENCE {
    ki   [0] octet STRING (SIZE (16)),
    r1   [1] INTEGER (0..127),
    r2   [2] INTEGER (0..127),
    r3   [3] INTEGER (0..127),
    r4   [4] INTEGER (0..127),
    r5   [5] INTEGER (0..127),
    c1   [6] octet STRING (SIZE (16)),
    c2   [7] octet STRING (SIZE (16)),
    c3   [8] octet STRING (SIZE (16)),
    c4   [9] octet STRING (SIZE (16)),
    c5   [10] octet STRING (SIZE (16)),
    amf  [11] octet STRING (SIZE (2)),
}

AuthenticationSequence ::= SEQUENCE {
    seq  [0] octet STRING (SIZE (6)),
    ind  [1] INTEGER (0..255),
} maxImpiLength         INTEGER ::= 250
maxUserDataLength     INTEGER ::= 250
maxVendorDataLength   INTEGER ::= 250
maxServiceDataLength  INTEGER ::= 250
maxDeviceDataLength   INTEGER ::= 250
END
```

FIGURE 4

NETWORK NODE, DEVICE AND METHODS FOR PROVIDING AN AUTHENTICATION MODULE

TECHNICAL FIELD

The present invention relates to authorization and authentication of devices.

BACKGROUND

Nowadays, a device needs a Subscriber Identity Module (SIM) card to be able to run an application or use a service that requires strong authentication such as Generic Bootstrap Authentication (GBA). SIM cards in use today comprise embedded integrated circuits and are able to provide identification and authentication. The information provided by SIM cards is usually an international mobile subscriber identity (IMSI) and a related key used to identify and authenticate the device.

SIM cards come in various formats which tend to decrease in size with the different generations of devices. Over the years we have seen Full-size SIMs, mini-SIMs, Micro-SIMs and Nano-SIMs, which are about the size of the integrated circuit themselves. The machine-to-machine (M2M) counterparts can be surface mounted by soldering Embedded-SIMs to circuit boards.

With reference to FIG. 1, the advent of the networked society and the forecasted 50 billion connected devices by year 2020, will lead to the production and physical delivery of billions after billions of SIMs. A greater number of M2M types of devices will need their SIMs soldered to their circuit boards. Operators will have to manually or semi-automatically provision these billions of SIM cards, linking the information of the physical cards to the devices. One can foresee that this will impose a growing burden on the industry and on the environment.

Some documents address different aspects of this problem; see for example WO2012058429, US20120108205, US20130303122 or WO2009092115 which describe electronic or virtual SIMs. These documents describe electronic or virtual SIMs either: being received virtually and stored on an embedded smart card, being part of the operating system of the device or being in the form of an application or a function that is run on an authorized server external to the device. However, none of these provide a solution such as the one described below.

SUMMARY

It is therefore an object to provide methods, network nodes and devices that obviate or mitigate at least some of the above described disadvantages.

There is provided a method executed in a network node, for providing an Authentication Module (AM) to a device. The method comprises computing an authentication parameter to be stored in the AM, using an identifier (ID) associated with the device, authentication data associated with the device and an encryption parameter associated with the device. The method also comprises providing the AM to the device.

There is also provided a method for updating the AM of a device. The method comprise computing a new authentication parameter to be stored in the AM, using the ID associated with the device, updated authentication data associated with the device and the encryption parameter associated with the device. The method also comprises providing the updated authentication data to the device.

There is also provided a method, executed in a device, for authenticating the device using an Authentication Module (AM). The method comprises sending an authentication request to a network node, receiving a response comprising a random string and a verification code, computing an expected verification code using the random string and an authentication parameter stored in the AM. The method also comprises authenticating the device responsive to determining that the received verification code corresponds to the expected verification code. The authentication parameter stored in the AM is computed using an identifier (ID) associated with the device, authentication data associated with the device and an encryption parameter associated with the device.

There is also provided a method for generating an authentication parameter for an Authentication Module (AM). The method comprises computing an authentication parameter to be stored in the AM, using an identifier (ID) associated with a device, authentication data associated with the device and an encryption parameter associated with the device.

There is also provided a network node for providing an Authentication Module (AM) to a device. The network node comprises a processor and a memory. The memory contains instructions executable by the processor, whereby the network node is operative to compute an authentication parameter to be stored in the AM, using an identifier (ID) associated with the device, authentication data associated with the device and an encryption parameter associated with the device. The network node is further operative to provide the AM to the device.

There is also provided a device using an Authentication Module (AM). The device comprises a processor and a memory. The memory contains instructions executable by the processor, whereby the device is operative to send an authentication request to a network node, receive a response comprising a random string and a verification code, compute an expected verification code using the random string and an authentication parameter stored in the AM and authenticate the device responsive to determining that the received verification code corresponds to the expected verification code. The authentication parameter stored in the AM is computed using an identifier (ID) associated with the device, authentication data associated with the device and an encryption parameter associated with the device.

There is also provided a network node for providing an Authentication Module (AM) to a device. The network node comprises a processing module for computing an authentication parameter to be stored in the AM, using an identifier (ID) associated with the device, authentication data associated with the device and an encryption parameter associated with the device. The network node further comprises an input/output (I/O) module for providing the AM to the device.

There is also provided a device using an Authentication Module (AM). The device comprises an input/output (I/O) module for sending an authentication request to a network node and for receiving a response comprising a random string and a verification code. The device further comprises a processing module, for computing an expected verification code using the random string and an authentication parameter stored in the AM and for authenticating the device responsive to determining that the received verification code corresponds to the expected verification code. The authentication parameter stored in the AM is computed using an identifier (ID) associated with the device, authentication data associated with the device and an encryption parameter associated with the device.

BRIEF DESCRIPTION OF THE DRAWINGS

FIG. 4 illustrates the content of an Authentication Module according to another embodiment.

DETAILED DESCRIPTION

The various features of the invention will now be described with reference to the figures. These various aspects are described hereafter in greater detail in connection with embodiments and examples to facilitate an understanding of the invention, but should not be construed as limited to these embodiments. Rather, these embodiments are provided so that the disclosure will be thorough and complete, and will fully convey the scope of the invention to those skilled in the art.

Many aspects of the invention are described in terms of sequences of actions or functions to be performed by elements of a computer system or other hardware capable of executing programmed instructions. It will be recognized that the various actions could be performed by specialized circuits, by program instructions being executed by one or more processors, or by a combination of both. Moreover, the invention can additionally be considered to be embodied within any form of computer readable carrier or carrier wave containing an appropriate set of computer instructions that can cause a processor to carry out the techniques described herein.

In some alternate implementations, the functions/acts may occur out of the order noted in the sequence of actions. Furthermore, in some illustrations, some blocks may be optional and may or may not be executed; these are generally illustrated with dashed lines.

Figure 1:
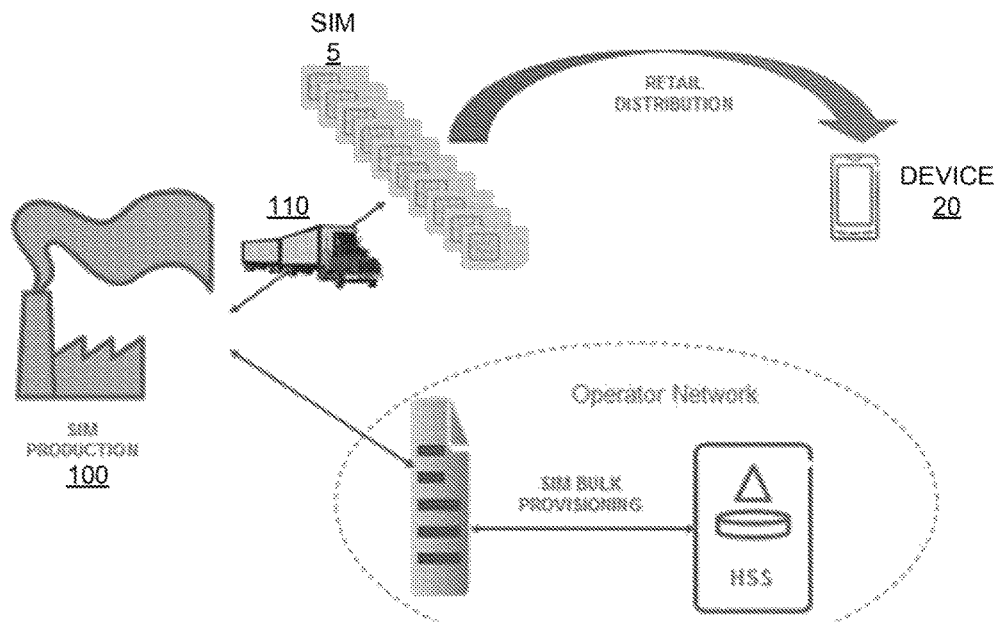
FIG. 1 schematically illustrates the current process for production and delivery of SIM cards.

Referring to FIG. 1, the production of physical Subscriber Identity Modules (SIMs) 5 for use for authentication of devices 20 has many disadvantages, namely that the SIMs 5 have to be physically produced 100, delivered 110, installed and even soldered in some cases of machine-to-machine (M2M). This physical production of SIMs generates waste from plastic, packing residues and $CO_2$ emissions from manufacturing and delivery.

Figure 2:
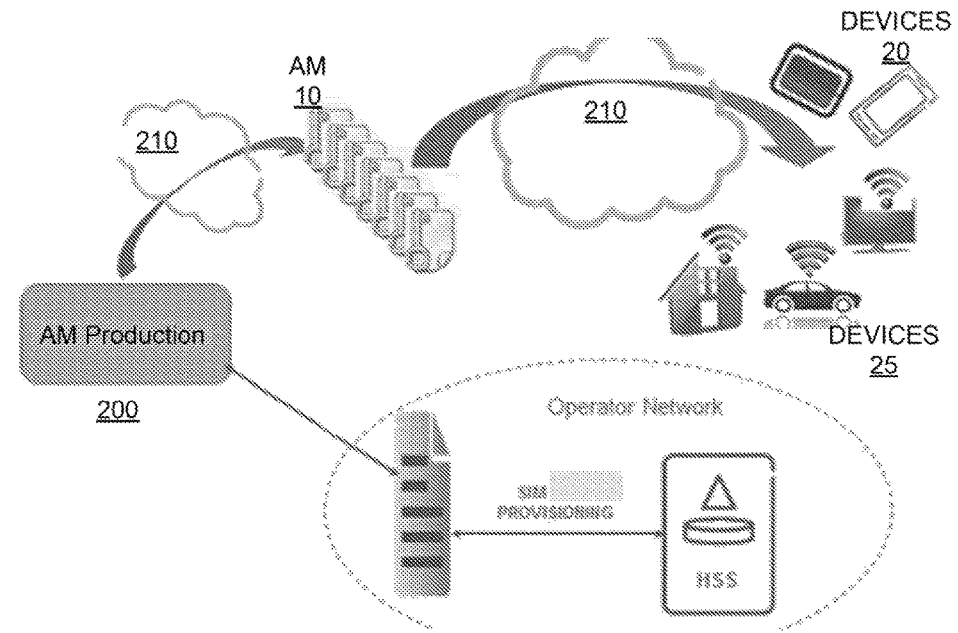
FIG. 2 schematically illustrates a process for production and delivery of Authentication Modules (AMs) according to an embodiment.

Turning now to FIG. 2, one can see that the disadvantages of producing and delivering physical SIMs 5 can be greatly alleviated when turning to production 200 and delivery 210 of virtual or software Authentication Modules (AMs) 10 according to some embodiments. In addition to this, the devices 20, 25 which traditionally had a physical space to hold and hardware to connect to a physical SIM 5 can be designed and built without these elements when an AM 10 is used.

The Authentication Module 10 is network agnostic and can be used with any Internet Protocol (IP) connectivity such as Wi-Fi, LTE or IMS networks, for example. The AM 10 further provides compatibility with commonly used SIMs 5. The AM 10 can provide strong Generic Bootstrap Authentication (GBA) and flexibility for service enablement. Therefore, a hardware SIM can be safely replaced by the AM 10 when it is not possible or practical to have a hardware SIM in a device.

The AM 10 provides an inexpensive option for M2M devices 25 such as connected car, smart devices or devices used for fleet management, smart grid, etc. It also provides for enhanced authorization protocol, such as Open ID® Connect, with GBA, for applications such as infotainment or consent management, for example. Such authorization protocols can be rolled out in the web industry in order to off-load authentication from a given web site, which provides a service, to an Identity Management Server, which provides the authorization. For example, it provides for a user to login to a web site with an identity from Facebook® or in the case where GBA is used, an AM. In this example, Facebook® or the AM is used to authenticate and authorize the device, while the web site provides the service.

Figure 3:
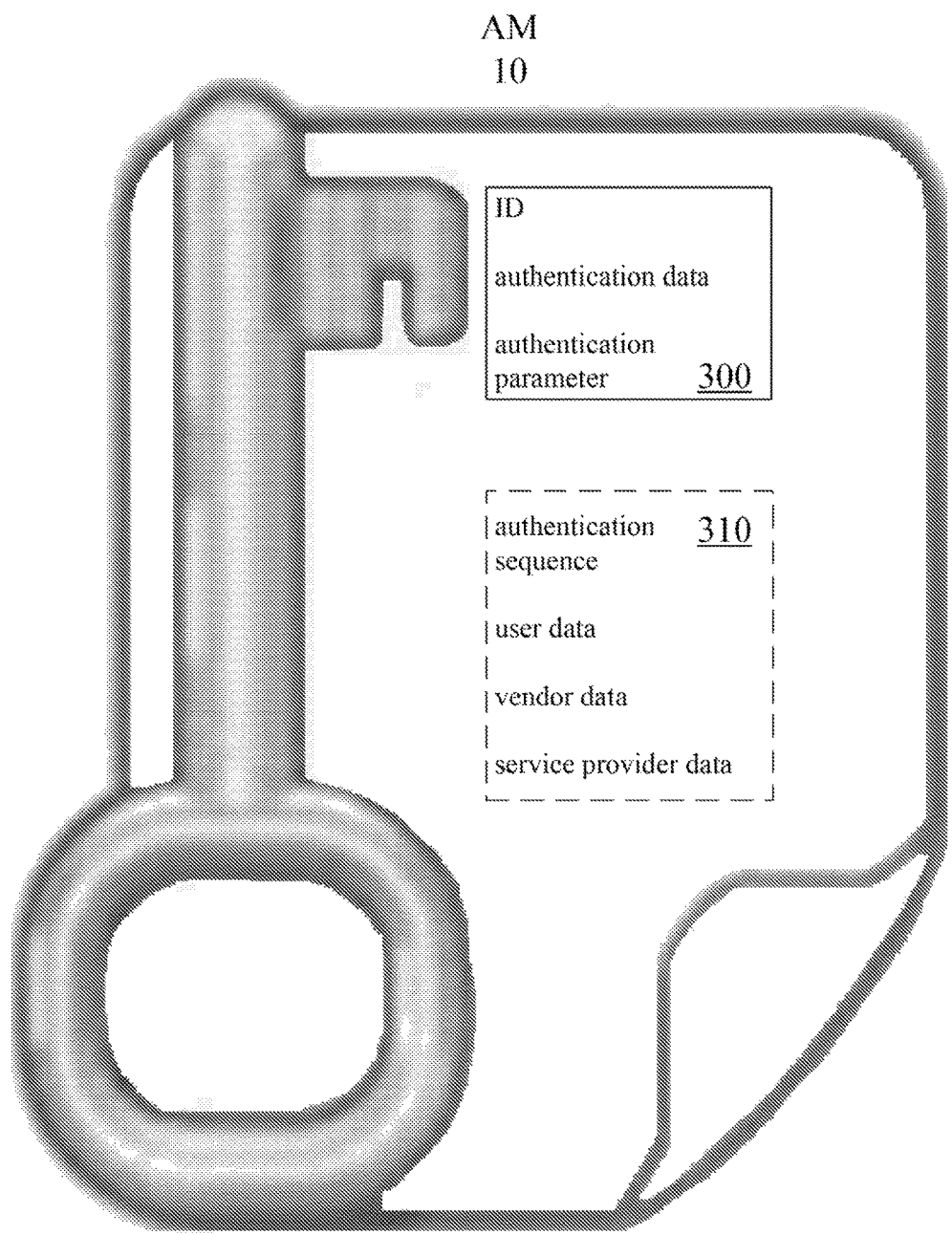
FIG. 3 schematically illustrates an Authentication Module according to an embodiment.

FIG. 3 illustrates symbolically the AM 10 and part of its content 300. The AM can be alternately called a virtual Subscriber Identity Module (vSIM) or software Subscriber Identity Module (sSIM). Elements of content 310 are optional and/or can be replaced with alternate fields or values. The AM 10, as will be explained below, may be stored in the device in the format of at least one file, which should preferably be encrypted. In an embodiment, the AM may be available in the device, with fields of data partly populated, prior to the execution of the methods provided below. In an alternate embodiment, the AM may be absent from the device prior to the execution of the methods provided below.

FIG. 4 illustrates a content of an Electronic Subscriber Authentication Information (ESAI) data structure, with example fields and content, which can be used as an AM 10 according to an embodiment. This data structure can be stored, for example, as a file in the memory of the device. The ESAI of the example embodiment of FIG. 4 relates to the 3GPP TS 35.206 specification.

The first section of the ESAI of FIG. 4 contains private and sensitive data such as user data, vendor data and service provider data. For example, user data can comprise Personal Identification Number (PIN), subscriber profile ID used by other applications, etc. vendor data can comprise version number, timestamp of last update, etc. and service provider data can comprise preferred subscriber profile reference, cookies type of flags that a service provider could need, etc. A person skilled in the art would understand that the previous lists of examples for user, vendor and service provider data are not exhaustive and that other data can be used. Such information or any additional information not listed can be used by an application such as an authorization module for web service consumption as explained above.

The second section IDType of the ESAI of FIG. 4 contains Internet Protocol (IP) Multimedia Subsystem (IMS) Private Identity (IMPI) and international mobile subscriber identity (IMSI), which are identifiers for the device and/or user.

The third section of the ESAI of FIG. 4 comprises a sequence of authentication information. Fields such as ki, r1-r5, c1-c5 and amf contain authentication fields or numbers, constant or integers, which can be used by the Milenage algorithm detailed in 3GPP TS 35.206, or by and equivalent algorithm. These fields may be used for computations done for the purpose of authentication, for example.

The fourth section authentication sequences of the ESAI contains authentication sequence numbers such as specified in Milenage algorithm, see again 3GPP TS 35.206. The remaining values of the ESAI indicate example lengths for previous fields or values of the ESAI.

The format used for the ESAI illustrated in the embodiment of FIG. 4 is Abstract Syntax Notation (ASN), but other embodiments could of course use modified versions of this data structure or a different format altogether.

Figure 5:
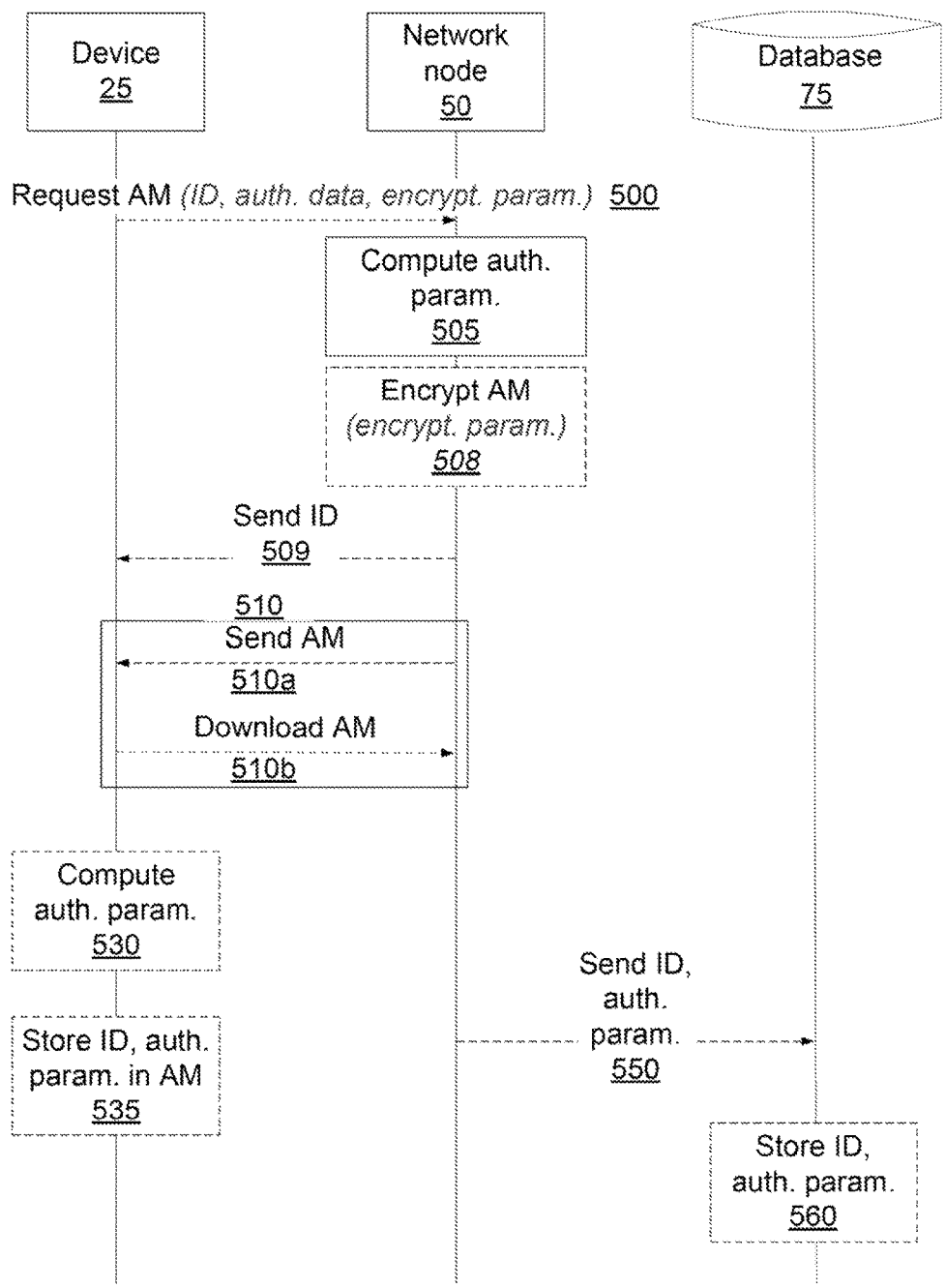
FIG. 5 is a flow diagram illustrating a method for providing an Authentication Module (AM) to a device according to an embodiment.

Referring now to FIG. 5, there is provided a method, executed in a network node 50, for providing an Authentication Module (AM) 10 to a device 20, 25 (generally 25 from now on). At step 500, the network node 50 may receive a request for the AM from the device 25. Alternatively, the network node can determine that a device needs an AM or the determination can be made otherwise, such as by a technician installing or activating the device 25. The request may comprise any or all of an identifier (ID) associated with the device, authentication data associated with the device and an encryption parameter associated with the device.

The encryption parameter described here, also called encryption key or encryption token, is associated with the device. The encryption parameter is used to read the AM and can be provisioned in the device by the manufacturer, by the OS provider or by a secure mechanism available in the device. This encryption key can be managed by the operating system (OS) of the device, for example, and can be installed either at the manufacturing stage or at the installation stage of the device. Alternatively, the encryption parameter can be managed in a Trusted Execution Environment (TEE) of a modem component of the device. The TEE can further contain the AM 10. The TEE is in communication with a GBA Application Programming Interface (API) accessible from the operating system of the device through an internal protected channel. The GBA API offers a client or provisioning agent accessible to external network nodes such as, for example, a provisioning server or a Bootstrapping Server Function (BSF). The embodiments disclosed herein take into account that each device possesses such an encryption parameter.

At step 505, the network node 50 computes an authentication parameter to be stored in the AM 10, using the ID associated with the device, the authentication data associated with the device and the encryption parameter associated with the device. In an embodiment, the ID used for the computation can be an IMPI which can be provided by the network node 50 or by another network node (not illustrated).

The authentication parameter may be computed using an Advanced Encryption Standard (AES) algorithm (or any other suitable encryption algorithm) taking as inputs a concatenation of the ID (or IMPI) and the authentication data associated with the device and the encryption parameter. The concatenation of the ID and the authentication data used for computing the authentication parameter may be in the form of a string generated using Basic Encoding Rules (BER) on a plurality of fields comprised in the authentication data. Other encoding rules can also be used.

The authentication data may be taken from the AM 10 such as illustrated in FIG. 3 or 4. It may be composed of one or of a plurality of fields which may comprise strings of characters of various lengths (predetermined or not). The authentication data used to compute the authentication parameter may comprise an authentication sequence, a user data, a vendor data and/or a service provider data. Other types of authentication data can alternately or additionally be used.

In using a concatenation of the ID and of one or more elements of the authentication data, a unique string, containing device and/or user specific information is obtained. The authentication parameter obtained is a very secure value which is stored in the AM and which is used thereafter in the authentication process.

At step 508, prior to being provided to the device, the AM may be encrypted using the encryption parameter associated with the device. In an embodiment, all or part of the component fields of the data structure ElectronicSubscriberAuthenticationInfo of the embodiment of FIG. 4 may be stored in a file and encrypted. An AES algorithm, a shared secret symmetric algorithm or any suitable type of encryption algorithm may be used to encrypt the AM, using the encrypted parameter, which may be, for example, a 128 bits encryption parameter. The resulting binary file can then be deployed in the device, for handling or performing GBA authentication. The encryption parameter needs to be kept secret and safely deployed in the device. The mechanisms by which this encryption parameter is kept safe are analogous to existing mechanisms of SIM protection. The integrity of the encryption parameter can be assured by the operating system or/and a personal pin, or it may be embedded in an application which needs to access the AM, etc. Of course the encryption parameter may be 256 bits, 512 bits, 1024 bits or any other suitable number of bits. Further to this step, any application that requires access to the encrypted AM needs the encryption parameter. The AM, in this format, allows for great security as it safeguards against the modification of authentication data and authentication parameter.

With reference to the embodiment of FIG. 4, the authentication parameter may be stored as the Operator Variant Algorithm Configuration Field (OP) parameter in the AM. The OP parameter according to its current definition in 3GPP TS 35.206 is a value expected to be defined once by each operator and used for all its subscribers or for batches of Universal Subscriber Identity Modules (USIMs). In an embodiment of the AM, the OP field is used to store the authentication parameter, which is unique for each user. It should be noted that other parameters than OP could have been chosen; already existing or that could be added to the ESAI, for example. It will be apparent to one with skills in the art that, in this particular embodiment, the use of the OP field is advantageous since it is used in many calculations in relation with the Milenage algorithm described in 3GPP TS 35.206.

In the embodiment of FIG. 4, the OP parameter has a size of 16 bits. Of course this size could be different, such as 32, 64, 128, 256 bits or any suitable number of bits. The size may be chosen to provide security on the one hand or computation speed on the other hand. A shorter authentication parameter provides for a faster authentication as would be apparent to a person skilled in the art while a longer authentication parameter provides for better security. Since some device may have less processing power, a shorter authentication parameter may be desirable in certain instances.

The authentication parameter, such as the OP, is the result of encryption, with an AES algorithm, using the encryption parameter as described above, of the a function H( ), which can be expressed as follows:

$$OP=AES[H(ID: \text{authentication data}), \text{encryption parameter}]$$

A person skilled in the art would recognize that different existing AES algorithms could be used, that new encryption algorithms are being developed and that any appropriate encryption algorithm, AES or not, could be used.

Any combination of fields within the ElectronicSubscriberAuthenticationInfo can be used in order to generate the authentication parameter. The calculation of the authentication parameter (such as the OP) can be done from a checksum of a series of parameters, ex: Ki, IMPI, Rs, Cs, etc. The list of parameters to be included in the checksum can vary according to the level of security desired, for example.

When an AM 10 is activated, the ID field, such as for example an IMPI, and the authentication parameter, such as the OP field, are provisioned in the ElectronicSubscriberAuthenticationInfo object. The ID and authentication parameter are also provisioned in a subscriber profile of a database 75, such as a Home Subscriber System (HSS). No other device, using its own ID, which is its private identity, such as the IMPI, could then attempt fraudulent authentication since the authentication parameter, such as the OP, generated by the formula given above is unique. This protects the AM from duplication and/or tampering.

Once the authentication parameter is stored in the AM, the AM therefore becomes very secure. The ID (such as the IMPI), authentication data and authentication parameter (which provides an encryption key for authentication) are all related to the particular device in which it is stored, to the user or subscriber to which it pertains and/or to the vendor, etc., depending on which fields of the authentication data is/are used for concatenating the string used for computing the authentication parameter with the AES algorithm. The same AM could not, with current security standards, be reproduced on another device or by another subscriber that uses a different ID and authentication data.

At step 509 of FIG. 5, the ID can be provided to the device or it can be provided at step 510, along with the AM 10. The AM 10 can be provided to the device 25 by sending the AM from the network node 50 to the device 10, at step 510a, or by enabling a download of the AM from the network node, at step 510b, through a data connection. Alternatively, the AM can be transferred from the network node to a portable data repository and the AM can be uploaded from the portable data repository to the device by wired or by short range wireless transmission. For example, the AM can be uploaded to the device from a Universal Serial Bus (USB) flash drive, from a solid state drive, through near field communication or through any another suitable wired or wireless means.

When the device itself has capabilities to compute the authentication parameter, before providing the AM to the device, the authentication parameter of the AM may be set to empty, to a dummy value, to a default value or to the computed authentication parameter. At step 530, when the device has capabilities to compute the authentication parameter, the authentication parameter can be computed by the device 25 and stored, step 535, in the AM 10 by the device itself.

When the device does not have the capabilities to compute the authentication parameter, the authentication parameter of the AM can be set, by the network node 50, to the computed authentication parameter before providing the AM 10 to the device 25.

The ID and authentication data are therefore stored in the AM either by the network node 50 or the device 25. The AM may contain, further to what is illustrated on FIG. 4, other fields or parameters such as other authentication parameters, PINs, sequence number (SQN), location information, user specific data, vendor specific data, service provider specific data and/or other information.

The AM 10 contains information required for authentication, for example through GBA, which may be arranged in a TAG-LENGTH-VALUE (TLV) format. BER may be used for encoding data, but formats such asExtensible Markup Language (XML) type description or other formats can also be used.

At step 550, the ID and the authentication parameter may be provided to a database for subsequent authentication use. The ID and authentication parameter may be encrypted prior to be provided to the database. The database 75 which stores the ID and authentication parameter, at step 560, may be a Home Subscriber System (HSS) or any database that contains authentication information of subscribers.

The network node 50 may be operative to execute a Bootstrapping Server Function (BSF) which is used to authenticate devices. The network node 50 executing the BSF may be operative to communicate with the HSS. The BFS may alternatively be executed in another network node (not illustrated).

The device 25 may be a Machine-to-Machine (M2M) device or a user equipment (UE). Examples of M2M devices include connected cars, electronic appliances, smart meters, connected homes, etc. The device may be any device running an application that requires authentication and authorization in order to consume a given service or communicate with another network node or device.

Figure 6:
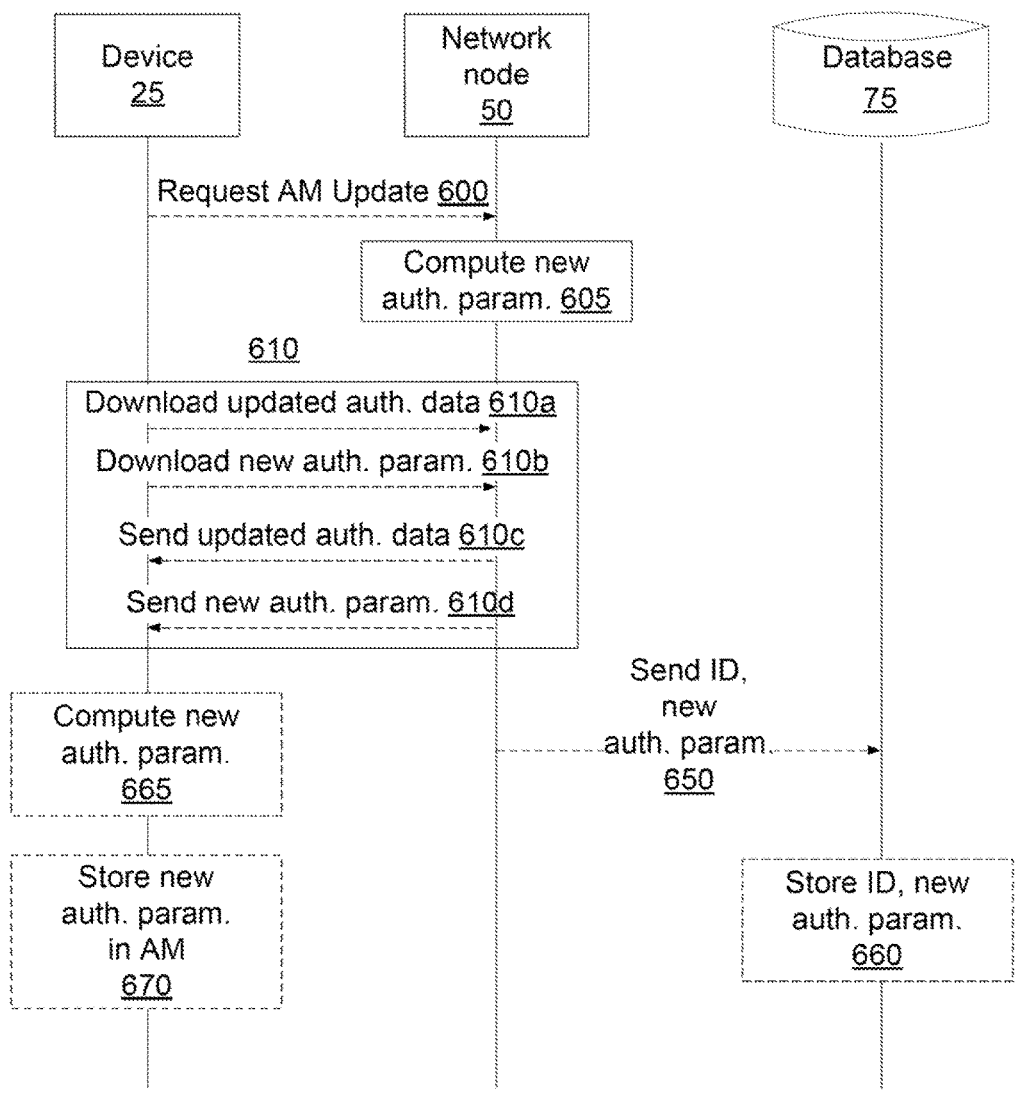
FIG. 6 is a flow diagram illustrating a method for updating an Authentication Module of a device according to an embodiment.

Referring now to FIG. 6, there is provided a method for updating the AM 10 of a device 25. At step 600, a request for an updated AM may be received from the device. Alternatively, the network node 50 may determine that an update (periodic or not) of the AM has to be done. Examples of periodic updates may be weekly or daily updates, for instance. Periodic updates may be desired for devices handling sensitive data or needing an increased level of security. At step 605, a new authentication parameter to be stored in the AM is computed by the network node 50, using the ID associated with the device, updated authentication data associated with the device and the encryption parameter associated with the device. At step 610, the updated authentication data and new authentication parameter are provided to the device. The AM, ID and/or authentication data may be encrypted, as explained above, before being provided to the device. The updated authentication data and new authentication parameter can either be downloaded, steps 610a and 610b, by the device from the network node or can be sent, steps 610c and 610d, to the device from the network node.

At step 650, the ID and the new authentication parameter may also be provided to a database 75, for instance an HSS, for subsequent authentication use. The ID and authentication parameter can be encrypted prior to being provided to the database 75. At step 660, the new authentication parameter associated with the ID may be stored in the database 75. At step 665, the device 25 can compute the new authentication parameter if it was not downloaded or sent from the network node, using the updated authentication data. The new authentication parameter can be stored in the AM 10 of the device 25 at step 670.

Figure 7:
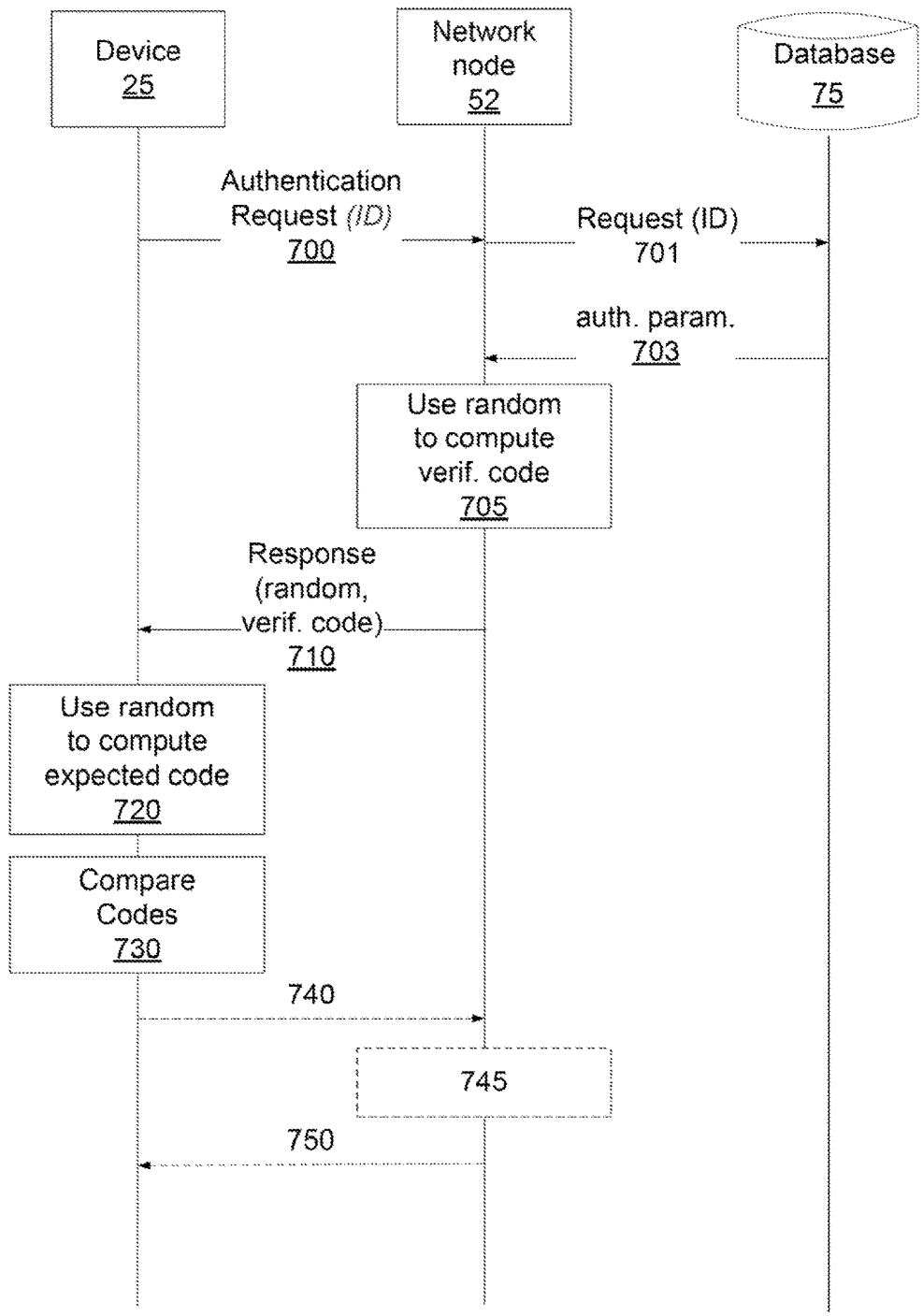
FIG. 7 is a flow diagram illustrating a method for authenticating a device according to an embodiment.

Turning to FIG. 7, there is provided a method, executed in a device 25, for authenticating the device, for example with Generic Bootstrap Authentication (GBA), using an Authentication Module (AM) 10. The device 25 may need authentication for using a service, an application or for connecting to another network node, server, device 25 or appliance. The method comprises, at step 700, sending an authentication request to a network node 52. The network node 52 may be the same network node as network node 50 or it can be another network node. Depending on the technology involved, the network node may be a BSF, an application server (AS), a Call Session Control Function (CSCF), a Mobility Management Entity (MME) or any suitable node. A request for the authentication parameter corresponding to the ID is sent at steps 701 from the network node 52 to the database 75, which in an embodiment may be an HSS.

At step 703, the database 75 returns the authentication parameter to the network node 52. At step 705, the network node 52 computes a verification code using a random string and the authentication parameter. The random string and the verification code are sent to the device 25 at step 710.

At step 720 the device 25 computes an expected verification code using the random string and the authentication parameter comprised in the AM stored locally in the device. At step 730, the device compares the verification code and the expected code and proceeds to authenticates itself upon determining that the received verification code corresponds to the expected verification code.

Further to this, the device 25 may send, at step 740, another request to the network node 52 containing a digest response computed in the previous step. At step 745, the network node may proceed to confirm authentication. The Network node may send, at step 750, an indication of success of the authentication to the device 25. If, however, the verification code does not correspond to the expected code, the device may abandon the function, service or application for which it was trying to authenticate.

The random string may be a random string of numbers, of characters or of both. The verification codes may be Media Authorization Codes (MACs) or any other suitable type of code. The expected verification code can be computed using an Advanced Encryption Standard (AES) algorithm taking as inputs the random string and the authentication parameter. The AES may be, for example, the Milenage algorithm discussed above. The authentication parameter used for the computation may be stored as the OP parameter of the AM and may be computed using an identifier (ID) associated with the device, authentication data associated with the device and an encryption parameter associated with the device.

The network node 52 is in communication with a database 75. The database is operative to provide a copy of the authentication parameter associated with the device to the network node 52, for computation of the expected verification code.

The method for generating an authentication parameter for an Authentication Module (AM) 10, which is illustrated more particularly as steps 505 or 530 of FIG. 5, and at step 605 or 665 of FIG. 6 may be executed in the device 25 or in the network node 50, as appropriate, and comprises computing an authentication parameter to be stored in the AM, using an identifier (ID) associated with a device, authentication data associated with the device and an encryption parameter associated with the device. The authentication data and ID may be stored in the AM 10. The authentication parameter may be computed using an Advanced Encryption Standard (AES) algorithm taking as inputs a concatenation of the ID and the authentication data and the encryption parameter. The authentication parameter may be the OP parameter. The AM may be stored in a repository of the device or the AM may be stored in at least two different files in the repository of the device.

Figure 8:
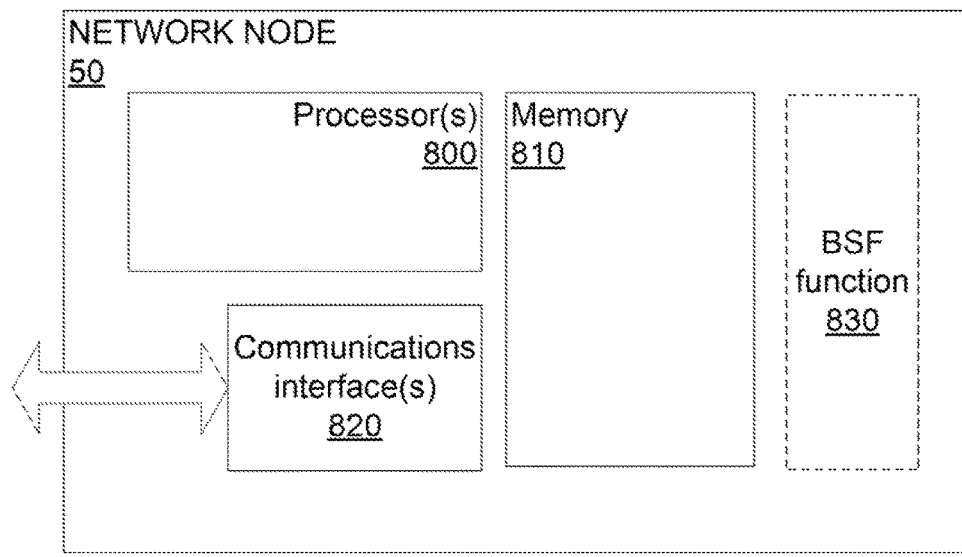
FIG. 8 is a block diagram illustrating a network node according to an embodiment.

Referring to FIG. 8, there is provided a network node 50 for providing an Authentication Module (AM) to a device 25. The network node 50 comprises a processor or a plurality of processors 800, which can be alternatively called processing circuit, and a memory 810. The memory 810 contains instructions executable by the processor 800, whereby the network node 50 is operative to execute the methods detailed in the above disclosure. The processor 800 is operative to compute an authentication parameter to be stored in the AM 10, using an identifier (ID) associated with the device, authentication data associated with the device and an encryption parameter associated with the device and to provide the AM to the device 25. The network node 50 may be operative to execute a Bootstrapping Server Function (BSF) 830 and to communicate with a database such as a Home Subscriber System (HSS), through the communication interface 820, for example.

Figure 9:
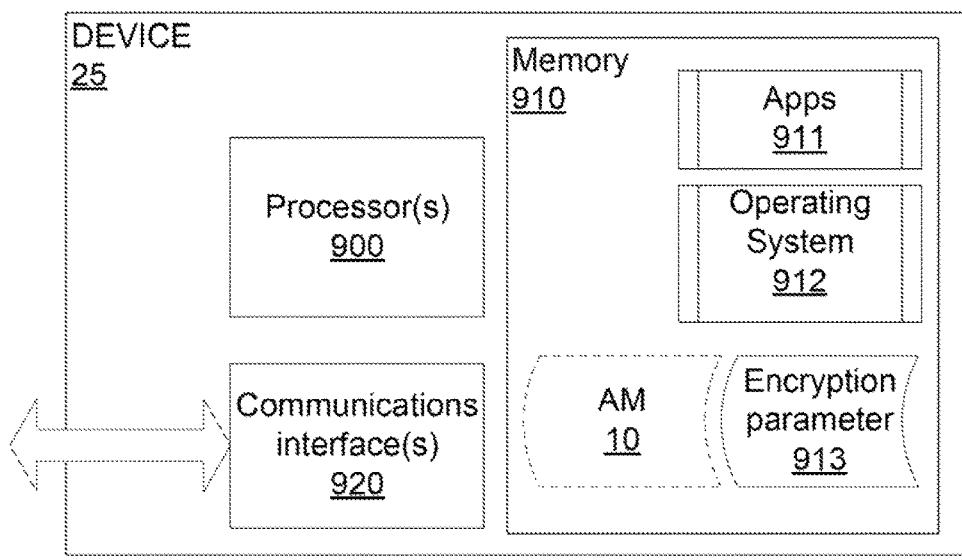
FIG. 9 is a block diagram illustrating a device according to an embodiment.

Referring to FIG. 9, there is provided a device 25 operative to use an Authentication Module (AM) for authentication. The device comprises a processor or a plurality of processors 900, which can be alternatively called processing circuit, and a memory 910. The memory 910 contains instructions executable by the processor 900, whereby the device is operative to execute the methods detailed in the above disclosure. The device is operative to send an authentication request to a network node and receive a response with a random string and a verification code, through the communication interface 920. The device is further operative to compute an expected verification code using the random string and an authentication parameter comprised in the AM, and to authenticate the device upon determining that the received verification code corresponds to the expected verification code.

The device 25 comprises a memory 910 for storing executable instruction of applications 911 and of an operating system 912 which may manage and store the encryption parameter 913 also called encryption key of the device. Still further, the memory of the device may contain the AM. The AM can be stored in one or in a plurality of files and can be stored in part on the device and in part in another repository inside or outside the device and accessible through the communication interface 920 of the device.

Figure 10:
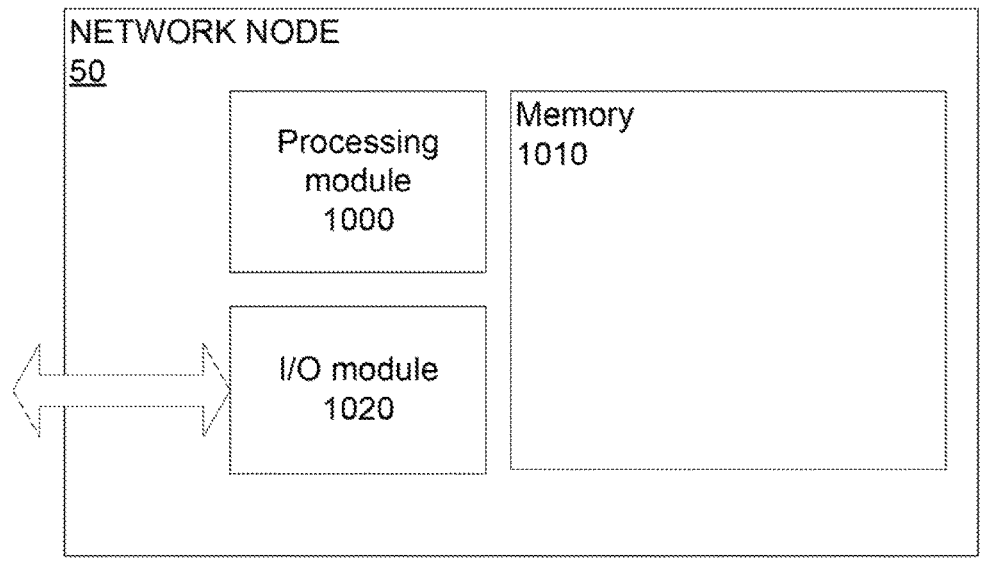
FIG. 10 is a block diagram illustrating another network node according to an embodiment.

FIG. 10 shows a network node 50 for providing an Authentication Module (AM) to a device 25 with functionalities similar to the functionalities described in relation with the network node described above. The network node 50 comprises a memory 1010. The network node 50 further comprises a processing module 1000 for computing an authentication parameter to be stored in the AM 10, using an identifier (ID) associated with the device, authentication data associated with the device and an encryption parameter associated with the device and an input/output (I/O) module for providing the AM to the device. The network node 50 may be operative to execute a Bootstrapping Server Function (BSF) and to communicate with a data base, such as a Home Subscriber System (HSS), through the communication interface 1020, for example.

Figure 11:
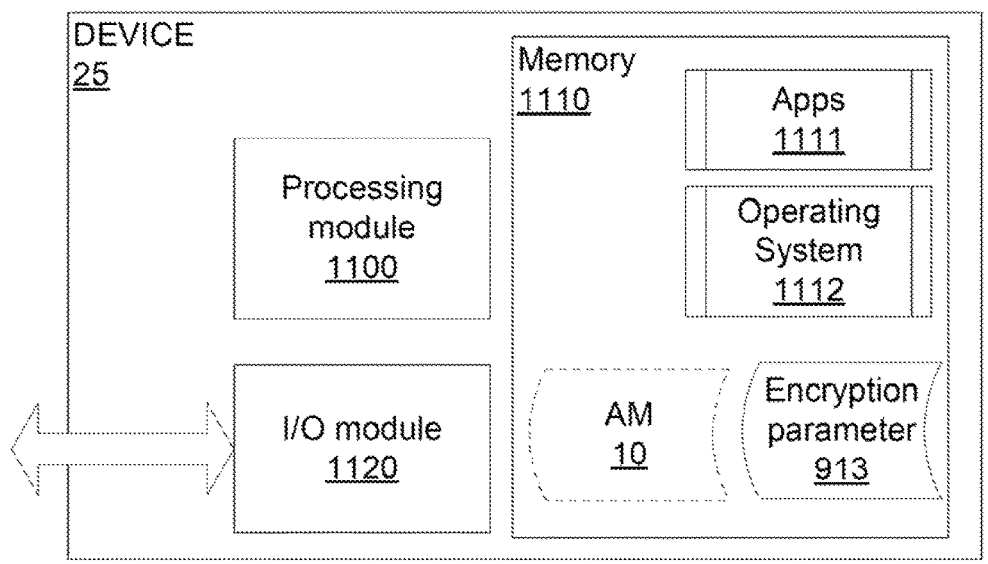
FIG. 11 is a block diagram illustrating another device according to an embodiment.

FIG. 11 shows a device 25 using an Authentication Module (AM) for authentication. The device 25 comprises a memory 1110 for storing executable instruction of applications 1111 and of an operating system 1112 which may manage and store the encryption parameter 913 of the device as well as the AM 10 or parts of the AM. The device 25 further comprises an input/output (I/O) module 1120 for sending an authentication request to a network node and for receiving a response with a random string and a verification code. The device 25 comprises a processing module 1100, for computing an expected verification code using the random string and an authentication parameter comprised in the AM and for authenticating the device upon determining that the received verification code corresponds to the expected verification code.

FIGS. 8-11 are block diagrams of network nodes and devices according to embodiments. The communications or input/output (I/O) interfaces 820, 920, 1020, 1120 generally includes analog and/or digital components for sending and receiving communications to and from network nodes 50 or devices 25 within a wireless coverage area, as well as sending and receiving wired communications to and from other network nodes, either directly or via a network. Those skilled in the art will appreciate that the block diagrams of the network nodes and devices necessarily omits numerous features that are not necessary for a complete understanding of this disclosure.

Although all of the details of the network nodes 50 and devices 25 are not illustrated, the network nodes 50 and devices 25 may comprise one or several general-purpose or special-purpose processors 800, 900, 1000, 1100 or other microcontrollers programmed with suitable software programming instructions and/or firmware to carry out some or all of the functionality of the network nodes 50 and devices 25 described herein. In addition, or alternatively, the network nodes 50 and devices 25 may comprise various digital hardware blocks (e.g., one or more Application Specific Integrated Circuits (ASICs), one or more off-the-shelf digital or analog hardware components, or a combination thereof) (not illustrated) configured to carry out some or all of the functionality of the network nodes 50 and devices 25 described herein. Memories 810, 910, 1010, 1110, such as a random access memories (RAM), may be used by the processors 800, 900, 1000, 1100 to store data and programming instructions which, when executed by the processors 800, 900, 1000, 1100, implement all or part of the functionality described herein. The network nodes 50 and devices 25 may also include one or more storage media (not illustrated) for storing data necessary and/or suitable for implementing the functionality described herein, as well as for storing the programming instructions which, when executed on the processors 800, 900, 1000, 1100, implement all or part of the functionality described herein. One or a plurality of the embodiments of the present disclosure may be implemented as a computer program product that is stored on a computer-readable storage medium, the computer program product including programming instructions that are configured to cause the processors 800, 900, 1000, 1100 to carry out the steps described herein.

Network node 50 and database 75 can also be executed in virtual machines (VMs) running on hardware processors being part of a cluster of machines located in a data center, for example. It can further be envisioned that the device 25 be made of sensors located in one physical location, able to transmit data to a virtual machine located in a different physical location accessible through the internet or through another network, and where the virtual machine can execute the methods provided herein.

The invention has been described with reference to particular embodiments. However, it will be readily apparent to those skilled in the art that it is possible to embody the invention in specific forms other than those of the embodiments described above. The described embodiments are merely illustrative and should not be considered restrictive in any way. The scope of the invention is given by the appended claims, rather than the preceding description, and all variations and equivalents that fall within the range of the claims are intended to be embraced therein.

The invention claimed is:

1. A method, executed in a device, for authenticating the device using an Authentication Module (AM), comprising the steps of:

sending an authentication request to a network node;

receiving a response comprising a random string and a verification code;

computing an expected verification code using the random string and an authentication parameter stored in the AM; and authenticating the device responsive to determining that the received verification code corresponds to the expected verification code;

wherein the authentication parameter stored in the AM is computed using an identifier (ID) associated with the device, authentication data associated with the device and an encryption parameter associated with the device;

wherein the authentication parameter stored in the AM is an Operator Variant Algorithm Configuration Field (OP) parameter;

wherein the random string is a random string of numbers;

wherein the verification codes comprise Media Authorization Codes (MACS); and wherein the network node is a Bootstrapping Server Function (BSF) in communication with a Home Subscriber System (HSS) operative to provide a copy of the authentication parameter associated with the device to the network node for computation of the verification code.

2. A device using an Authentication Module (AM) comprising: a processor; and a memory, said memory containing instructions executable by said processor, whereby said device is operative to:

send an authentication request to a network node;

receive a response comprising a random string and a verification code;

compute an expected verification code using the random string and an authentication parameter stored in the AM; and authenticate the device responsive to determining that the received verification code corresponds to the expected verification code;

wherein the authentication parameter stored in the AM is computed using an identifier (ID) associated with the device, authentication data associated with the device and an encryption parameter associated with the device;

wherein the authentication parameter stored in the AM is an Operator Variant Algorithm Configuration Field (OP) parameter;

wherein the random string is a random string of numbers;

wherein the verification codes comprise Media Authorization Codes (MACS); and wherein the network node is a Bootstrapping Server Function (BSF) in communication with a Home Subscriber System (HSS) operative to provide a copy of the authentication parameter associated with the device to the network node for computation of the verification code.

* * * * *